J. C. MACKEY.
ATTACHMENT FOR INTERNAL COMBUSTION ENGINES.
APPLICATION FILED OCT. 15, 1914.
1,208,598.  Patented Dec. 12, 1916.
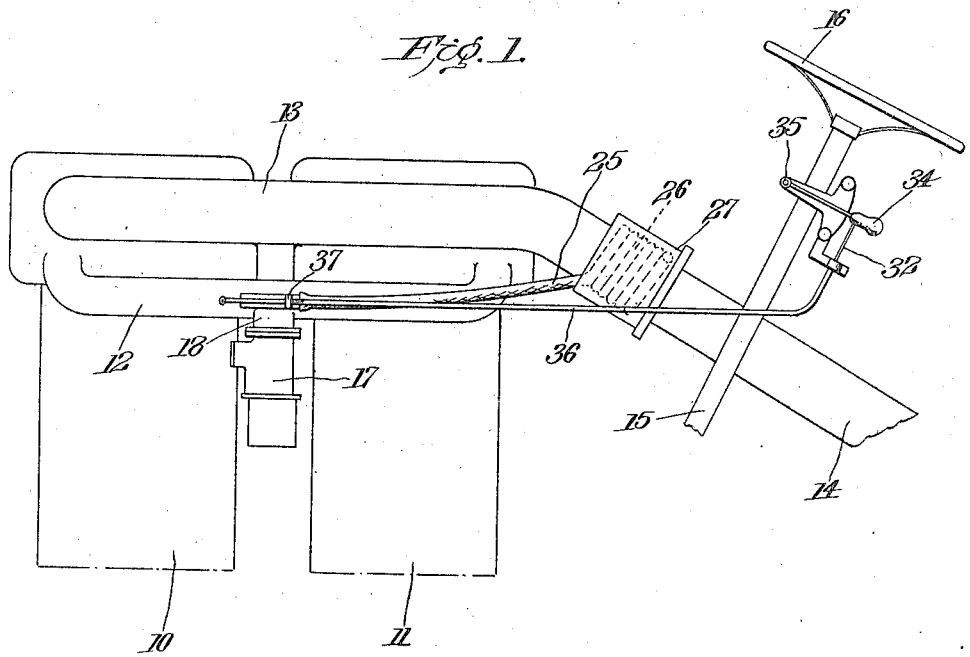
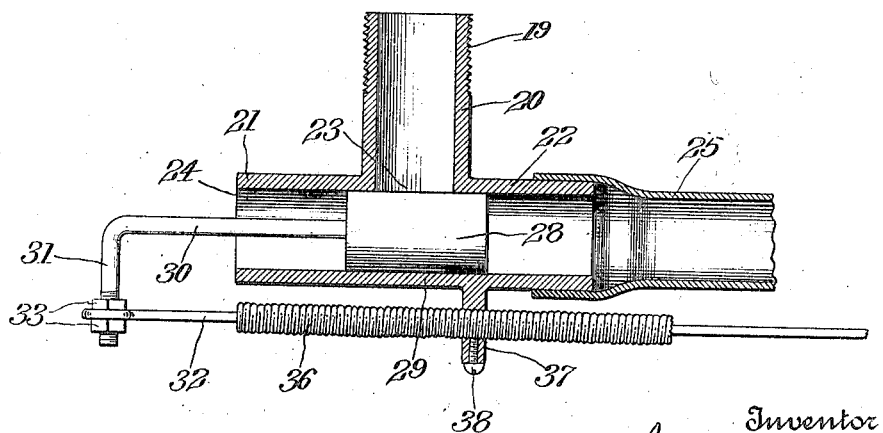

UNITED STATES PATENT OFFICE.

JOHN CLINTON MACKEY, OF NEW YORK, N. Y., ASSIGNOR, BY DIRECT AND MESNE ASSIGNMENTS, TO THE MACKEY-REUSING GAS SAVER COMPANY, A CORPORATION OF OHIO.

ATTACHMENT FOR INTERNAL-COMBUSTION ENGINES.

1,208,598.     Specification of Letters Patent.     Patented Dec. 12, 1916.

Application filed October 15, 1914. Serial No. 866,835.

*To all whom it may concern:*

Be it known that I, JOHN C. MACKEY, a citizen of the United States, residing at New York, county of New York, State of New York, have invented certain new and useful Improvements in Attachments for Internal-Combustion Engines, of which the following is a specification.

My invention relates to attachments for internal combustion engines and more particularly to a device for controlling the hot and cold air delivered to the engine.

It has been the general practice to attach the hot air device to the carbureter to heat the mixture, but this has the disadvantage that the gasolene will be continuously vaporized even when the motor is not running. The device herein described is attached to the intake manifold of the engine above the carbureter and therefore the hot or cold air does not come in contact with the carbureter, but comes in contact with the gasolene passing through the manifold and either heats or cools the same, according to the temperature of the air admitted. By this arrangement the gasolene is not used until needed and results in a considerable saving of fuel. By using hot air the gasolene is superheated, giving more power from a given quantity of fuel and making it possible to increase the speed of the engine by simply varying the hot air supply. On the other hand by admitting cold air it is possible to utilize the attachment as a brake since the mixture supply as well as the engine will be cooled off according to the temperature of the cooling air admitted.

The objects and novel features of the invention will be apparent from the following description taken in connection with the drawing, in which, Figure 1 is a side elevation of so much of an automobile as is necessary to show the application of my invention to the engine thereof, and Fig. 2 is a central longitudinal cross section of an attachment constructed according to this invention.

Referring to the drawing, the numerals 10 and 11 designate a pair of internal combustion engines mounted on an automobile. The engines are provided with an intake manifold 12 which is connected to each of the engines, and an exhaust manifold 13 also connected to each of the engines and leading rearwardly and under the automobile by a pipe 14. The automobile is also provided with the usual steering column 15 which has a steering wheel 16 at its upper end near the driver's seat and from which the steering wheel may be controlled. The device which controls the hot and cold air supplied to the intake manifold 12 is fitted on the pipe 18 leading from the carbureter 17 to the intake manifold 12. The pipe 18 is tapped at its outer side to receive the threaded end 19 of the branch 20 of the attachment.

The attachment comprises a T-shaped pipe, two ends 21 and 22 of which communicate through the opening 23 intermediate their ends with the right angled extension 20 that is connected to the intake manifold of the engine. The end 21 is open as at 24 to the atmosphere and the end 22 is connected by a flexible tube 25 with a pipe 26 wound around the exhaust manifold 13, the pipe 26 opening at its other end to the atmosphere. The pipe 26 which is wound around the exhaust manifold 13 to derive heat therefrom is covered by a sleeve 27 secured to the manifold 13. The connection of the port 23 with the hot or cold air supply is effected by a plunger 28 which works across the port 23 in a straight portion of the pipe 29 made up of the parts 21 and 22. The plunger 28 has a stem 30 which extends through the opening 24 in the end of the pipe section 21 and has a right angle bend 31 to the outer end of which the flexible operating rod 32 is detachably and adjustably connected by the nuts 33 fitting the threaded end of the right angled extension 31 and clamping the end of the rod 32 between them. The opposite end of the rod 32 is secured to a handle 34 which is mounted on a pivot 35 about which the handle 34 is rockable so that the rod 32 may be reciprocated to move the plunger 28 in the pipe 29. The handle 34 is located near the steering wheel 16 where it may be accessible from the driver's side to either cut off the supply of air to the intake manifold or to control the hot or cold air supply. The rod 32 is surrounded by a flexible coil 36 through which the rod 32 is free to move and the flexible coil 36 extends through the lug 37 integral with the pipe 29. The coil 36 is held in place by a set screw 38, which extends through the edge of the lug 37 and prevents the movement of the same.

The operation of the device will be apparent from the foregoing description. In starting the engine the plunger 28 of the device is set in the position shown in Fig. 2, the handle 34 being in mid position. In order to admit cool air direct from the atmosphere the handle 34 is raised, which moves the plunger 28 to the right in Fig. 2 and puts the opening 24 in communication with the opening 23. In order to admit heated air to the manifold, the plunger is moved to the left from the position shown in Fig. 2, which connects the branch 20 of the T-fitting with the pipe or tube 25 which leads to the heating coil 26 surrounding the exhaust manifold.

While I have shown and described a particular embodiment of my invention I do not wish to be limited to the exact construction illustrated as it will be evident that numerous changes may be made in the device without departing from the spirit of the invention.

Having thus described the invention, what is claimed is:

1. An attachment for internal combustion engines comprising a T-shaped hollow fitting, one branch of which is capable of being connected to the intake manifold of an internal combustion engine, a second branch and a third branch located in alinement and integrally connected with the first branch, the second branch having direct communication with the atmosphere and constituting a cold air inlet, the third branch constituting an inlet for heated air, a plunger slidably movable in a straight line in the second and third branches and across the entrance of the first-mentioned branch, said plunger being adapted to completely close the entrance of the first-mentioned branch of the fitting to cut off the air flowing from either of the second or third branches to the first branch, and means for operating said plunger.

2. An attachment for internal combustion engines comprising a T-shaped hollow fitting, one portion of which consists of a pipe open at both ends to respectively provide a cold air inlet and a hot air inlet for the fitting, a branch pipe intermediate the ends of the first mentioned pipe and disposed at right angles thereto and having communication with the first mentioned pipe, and a valve member fitting in the first mentioned pipe between the ends thereof and being adapted to cut off the communication between both ends of the first mentioned pipe and the branch pipe.

3. An attachment for internal combustion engines comprising a T-shaped hollow fitting having one branch capable of being connected to the intake manifold of an engine, a second branch and a third branch located in line and capable of being connected in communication with the first branch, the second branch having direct communication with the atmosphere and constituting the cold air inlet, the third branch constituting an inlet for heated air, a plunger slidably movable in a straight line in the second and third branches of said fitting and controlling communication between the latter and said first mentioned branch of the fitting, a stem connected to said plunger and extending outwardly through the cold air inlet and to one side thereof, a guide on said fitting, and an operating rod connected to the stem of the plunger and slidable on said guide.

In testimony whereof I affix my signature in presence of two witnesses.

JOHN CLINTON MACKEY.

Witnesses:
P. P. HENRY,
EVALYN M. BOWEN.

Copies of this patent may be obtained for five cents each, by addressing the "Commissioner of Patents, Washington, D. C."